United States Patent
Spurny

[19]

[11] Patent Number: 6,125,536
[45] Date of Patent: Oct. 3, 2000

[54] CONNECTING ROD FOR PISTON-OPERATED MACHINES, ESPECIALLY COMPRESSORS, AND PROCESS FOR ITS PRODUCTION

[75] Inventor: Dieter Spurny, Reichertshausen, Germany

[73] Assignee: Knorr-Bremse Systeme fur Nutzfahrzeuge GmbH, Munich, Germany

[21] Appl. No.: 09/029,354
[22] PCT Filed: Jul. 19, 1996
[86] PCT No.: PCT/DE96/01327
§ 371 Date: Feb. 24, 1998
§ 102(e) Date: Feb. 24, 1998
[87] PCT Pub. No.: WO97/08467
PCT Pub. Date: Mar. 6, 1997

[30] Foreign Application Priority Data

Aug. 25, 1995 [DE] Germany ............... 195 31 365

[51] Int. Cl.[7] .................................................. B21D 53/84
[52] U.S. Cl. ........................... 29/888.09; 29/413; 29/415; 29/416
[58] Field of Search ................... 29/888.09, 413, 29/414, 415, 416, 417; 225/2, 104, 103; 72/356, 377

[56] References Cited

U.S. PATENT DOCUMENTS

| | | |
|---|---|---|
| 4,668,107 | 5/1987 | Showalter . |
| 4,860,419 | 8/1989 | Hekman .................... 29/888.09 |
| 4,970,783 | 11/1990 | Olaniran et al. .......... 29/888.09 |
| 4,993,134 | 2/1991 | Hoag et al. ............... 29/888.09 |
| 5,105,538 | 4/1992 | Hoag et al. . |
| 5,109,605 | 5/1992 | Hoag et al. ............... 29/888.09 |
| 5,115,564 | 5/1992 | Miessen et al. .......... 29/888.09 |
| 5,208,979 | 5/1993 | Schmidt .................... 29/888.09 |
| 5,507,093 | 4/1996 | Wittenstein et al. ..... 29/888.09 |

FOREIGN PATENT DOCUMENTS

| | | |
|---|---|---|
| 167 320 | 1/1986 | European Pat. Off. . |
| 342 800 | 11/1989 | European Pat. Off. . |
| 396 797 | 11/1990 | European Pat. Off. . |
| 507 519 A2 | 10/1992 | European Pat. Off. . |
| 40 07 437 A1 | 9/1991 | Germany . |
| 43 06 280 A1 | 9/1994 | Germany . |
| 43 32 444 A1 | 3/1995 | Germany . |
| WO 87/06509 | 11/1987 | WIPO . |

*Primary Examiner*—David P. Bryant
*Assistant Examiner*—Marc W. Butler
*Attorney, Agent, or Firm*—Barnes & Thornburg

[57] ABSTRACT

In a connecting rod with a split big-end, the unmachined part is preferably aluminum die-casting in which notches are made along the subsequent line of separation. The big-end is separated substantially along the intended break line by means of a shearing tool capable of widening the eye in the region of intended bore reliefs in such a way that subsequent opening out is unnecessary.

2 Claims, 2 Drawing Sheets

CONNECTING ROD FOR PISTON-OPERATED MACHINES, ESPECIALLY COMPRESSORS, AND PROCESS FOR ITS PRODUCTION

BACKGROUND AND SUMMARY OF THE INVENTION

The invention relates to a connecting rod for a piston and more specifically as well as to a process for producing such a connecting rod.

Diecast connecting rods, such as aluminum diecast connecting rods for compressors, are known which are constructed as closed connecting rods or as split connecting rods. Split connecting rods are produced, for example, of two cast parts which are provided with fixing noses. Also known are connecting rods which are split mechanically and are fixed with respect to one another by close-tolerance bolts or pins or profilings.

For the finishing of split connecting rods, before the machining of the bore of the split big end, its top part must be screwed to its bottom part and must be marked in a suitable manner. The construction of lateral bore reliefs in the form of opened-out areas is not easily possible and, if at all, can be provided in the unmachined part. Connecting rods of the known type will still require a mechanical finishing with increased expenditures of time and cost.

In addition, the screwing of the top part to the bottom part, which precedes the finishing, presents problems because, even in the case of the most exact centering of the parts, a slight offset must always be accepted. Such a spatial offset disadvantageously influences the lubricating film which, after the mounting on the crank pin, exists between it and the interior circumference of the big end eye; that is, forms during the rotation of the crank pin relative to the eye.

Based on the above, it is an object of the invention to provide a connecting rod for piston-operated machines, particularly compressors, which, with respect to its splitting, can be manufactured with low expenditures of time and cost and nevertheless permits an extremely precise manufacturing, mainly in the area of the splitting of the big end and of the big-end eye.

It is also an object of the invention to provide a process for manufacturing a connecting rod of this type.

The process of the invention and the product manufactured by means of it have the advantage that the unmachined part of the connecting rod can be finished like a closed connecting rod and is split only before the mounting in the compressor of other machines by a suitable separating-breaking tool at the separating point, that is, along a desired breaking line. In this case, it is a special advantage that the profile (toothing) of the breaking point which forms during the breaking is subsequently used as a fixing device for the connection and at the same time for a protection with respect to an exchange. In the case of a corresponding construction of the breaking-shearing tool and taking into account the separating forces and deformations, it is possible to achieve the optimal construction of the big end eye without requiring a mechanical finishing. In particular, it is possible to subsequently shape opened-out areas serving as bore reliefs on the interior circumference of the big end eye by means of the shearing tool.

In the following, the invention will be explained by means of an embodiment with reference to the attached drawing.

BRIEF DESCRIPTION OF THE PREFERRED EMBODIMENTS

Figure 1:
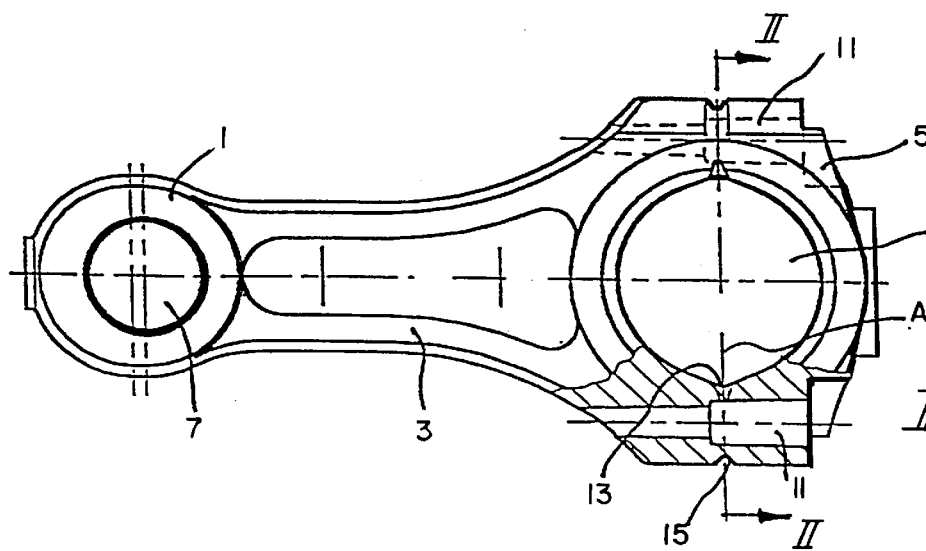
FIG. 1 is a partially cut away lateral view of an unmachined part of the connecting rod according to the invention which illustrates the notches predetermined for the line of separation on the interior circumference of the big end eye and on the exterior area of the big end.

FIG. 1 of the drawing illustrates a connecting rod which consists of a spherical part 1, a connecting rod shank 3 and a big end 5 and which, according to the invention, is prepared for a split extending along the plane A. The connecting rod is preferably made of a diecast aluminum material and is illustrated as an unmachined part; that is, the illustrated connecting rod produced as a die-casting has the eye of the spherical head, the eye 9 of the big end and optionally the passages 11 for (not shown) fastening screws.

Figure 3:
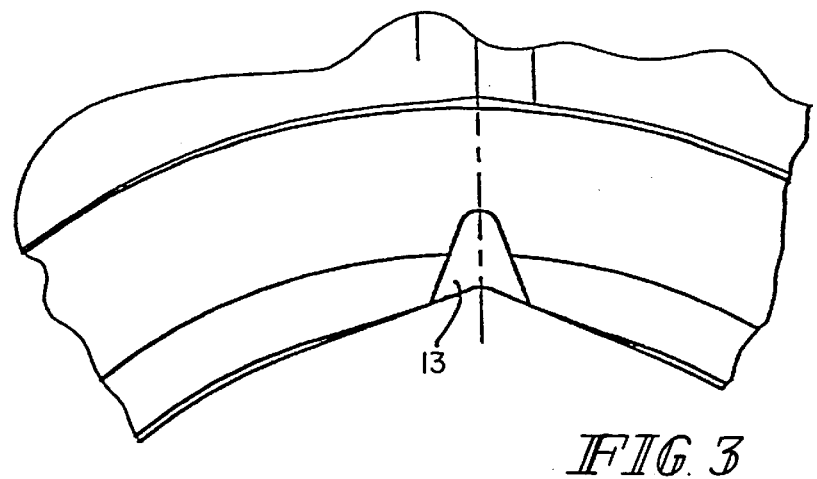
FIG. 3 is an enlarged individual view of the notch situated on the interior circumference of the big-end eye.
Figure 2:
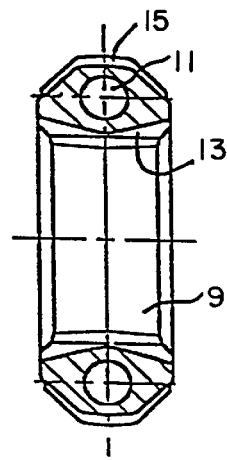
FIG. 2 is a sectional view of Line II—II in FIG. 1 illustrating the notches used for the separation.

In the area of the plane A, the unmachined part of the connecting rod illustrated in FIG. 1 is provided with notches 13 and 15 extending on the interior side on the interior circumference of the eye 9 and on the exterior side respectively. In the sectional view and as an enlarged individual view, the FIGS. 2 and 3 show the possible contouring of the notches 13 and 15.

Starting from the unmachined part illustrated in FIG. 1, the connecting rod will then be subjected to a finishing; that is, the eyes 7 and 9 are drilled with the required precision; likewise, the passages 11 are provided with internal threads 17, as required. With the exception of the area of the notch 13, the eye 9 has a circular shape which, in the course of the splitting to be carried out subsequently, may experience a deviating of the contour.

Figure 5:
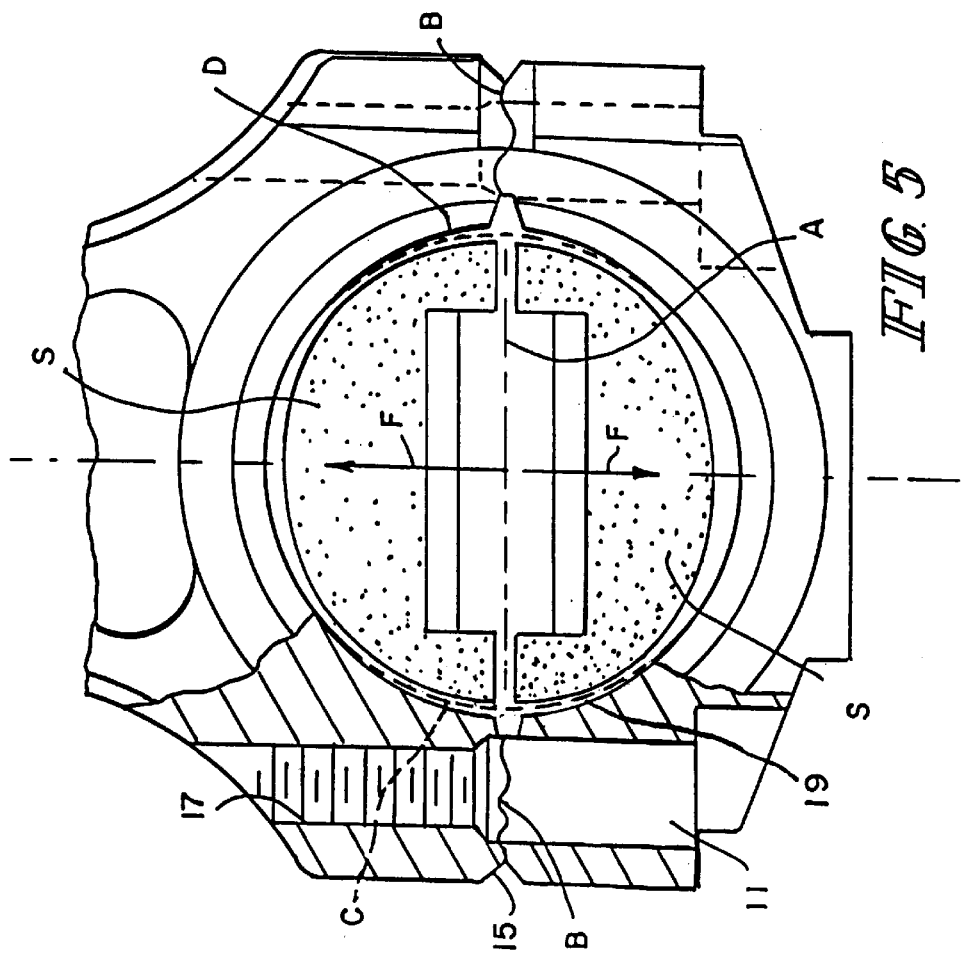
FIG. 5 is an enlarged, partially cut lateral view of the big end of the connecting rod, showing the line of separation and the opened-out areas shaped out by means of the shearing tool by way of the separation.
Figure 4:
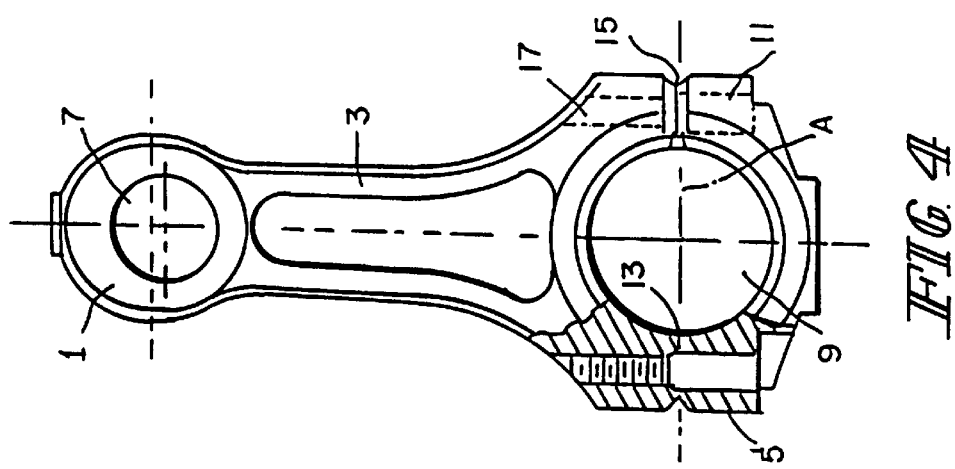
FIG. 4 is a partially cut-away lateral view of the connecting rod which is comparable to FIG. 1, after its mechanical finishing.

As illustrated above, the unmachined part of the connecting rod is finished, specifically with respect to all areas to be subjected to a manufacturing. The connecting rod will at first exist as a closed connecting rod and will be split only before the mounting in the compressor by means of a corresponding tool and measures at the separation point (plane A) of the unmachined part. In this case, a correspondingly constructed shearing tool will be used which takes into account the separating forces and deformations which occur during this operation, whereby an optimal construction of the bearing form is achieved without the requirement of a mechanical finishing. An exemplary tool S is shown in FIG. 5 interior the eye 9 as having two halves. The tool S separates in the direction F shown by the arrows to simultaneously create the separating forces and deformations.

As an enlarged, partially cut lateral view, FIG. 5 reflects Line B of the course of the break at the big end 5. In the left sectional half according to FIG. 5, C indicates the circular course of the bore of the eye 9 before the breaking along Line B, while, in the right sectional half according to FIG. 5, D indicates the course on the interior circumference of the eye 9 after the separation or after the break of Line B. A comparison of the two contours C and D shows that, when the connecting rod head 5 is separated by means of a suitable tool, opened-out areas 19 and therefore indentations are created which are expedient for receiving lubricants in the case of such connecting rods, specifically in the area of the pressure relief of the crank pin.

During the mounting of the connecting rod split in the above-mentioned manner on a crank pin (connecting rod bearing pin), thus during the joining of the top part and the bottom part, it is particularly advantageous that an essentially arbitrary toothing was formed during the breaking. This toothing profile permits an absolutely noninterchangeable joining and screwing to the crank pin, specifically without any offset.

List of Reference Numbers 1 spherical head
2 connecting rod shank
5 big end
7 eye
9 eye
11 passage
13 notch
15 notch
17 internal thread
19 opened-out area

What is claimed is:

1. A process for producing a connecting rod for piston-operated machines having a split extending through a big end having an eye, the process comprising the following steps taking place chronologically:

a) mechanical finishing an un-machined die cast part except for the next process steps, b) in an area of an intended split of the big end, forming notches on an interior circumference of the big-end's eye and on an exterior area of the big end opposite the interior notches to weaken material there between, and c) breaking the big end along a breaking line of separation defined by the notches and simultaneously forming, by the breaking, opened-out areas on an interior side of the big-end's eye to be used as bore reliefs using a tool interior to the eye and shaped to create forces substantially transverse to and along the breaking line to produce the breaking and forming the opened-out areas respectively.

2. A process according to claim 9, wherein the die cast part is part an aluminum die-casting.

* * * * *